(12) United States Patent
Boulos

(10) Patent No.: US 8,738,014 B2
(45) Date of Patent: May 27, 2014

(54) DYNAMIC VCC ASSIGNMENT

(75) Inventor: Pierre Boulos, Richardson, TX (US)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 0 days.

(21) Appl. No.: 13/524,137

(22) Filed: Jun. 15, 2012

(65) Prior Publication Data

US 2013/0337804 A1    Dec. 19, 2013

(51) Int. Cl.
| | |
|---|---|
| *H04W 40/00* | (2009.01) |
| *H04W 4/16* | (2009.01) |
| *H04W 4/22* | (2009.01) |
| *H04W 8/02* | (2009.01) |
| *H04W 8/04* | (2009.01) |

(52) U.S. Cl.
CPC ...... *H04W 4/16* (2013.01); *H04W 4/22* (2013.01); *H04W 8/02* (2013.01); *H04W 8/04* (2013.01)
USPC ..... 455/445; 455/452.1; 455/433; 455/432.3; 455/435.1

(58) Field of Classification Search
CPC ........... H04W 4/16; H04W 4/22; H04W 8/02; H04W 8/04; H04W 8/06
USPC ................. 455/445, 452.1, 433, 432.3, 435.1
See application file for complete search history.

(56) References Cited

U.S. PATENT DOCUMENTS

| | | | |
|---|---|---|---|
| 2009/0097450 A1* | 4/2009 | Wallis et al. | 370/331 |
| 2009/0303985 A1* | 12/2009 | Tanabe et al. | 370/352 |
| 2010/0124897 A1* | 5/2010 | Edge | 455/404.1 |
| 2010/0278125 A1* | 11/2010 | Clair et al. | 370/329 |

* cited by examiner

*Primary Examiner* — Khai M Nguyen

(57) ABSTRACT

A VCC in a telecommunications network which also has an HLR, an S-CSCF, and an IMS mobile or UE. The VCC includes a network interface unit of the VCC which receives an indication that the mobile is registering with the network or attempting to make or receive an IMS communication session. The VCC includes a processing unit of the VCC which assigns a VDN or a telephony network routing identifier for the mobile, and assigns a VCC point code. The VDN is sent from the network interface unit through the network to the UE or the mobile. The VCC point code for the mobile or the UE is sent from the network interface through the network to the HLR to update the mobile's or UE's profile data in the HLR. A method for assigning a VCC to an IMS mobile or UE in a telecommunications network which also has an HLR and an S-CSCF.

18 Claims, 7 Drawing Sheets

DYNAMIC VCC ASSIGNMENT

TECHNICAL FIELD

The present invention is related to assigning a VCC to an EMS mobile or UE in a telecommunications network. (As used herein, references to the "present invention" or "invention" relate to exemplary embodiments and not necessarily to every embodiment encompassed by the appended claims.) More specifically, the present invention is related to assigning a VCC to an IMS mobile or UE in a telecommunications network where the mobile or UE is assigned a VDN or a telephony network routing identifier and the VDN is sent to the mobile or UE.

BACKGROUND

This section is intended to introduce the reader to various aspects of the art that may be related to various aspects of the present invention. The following discussion is intended to provide information to facilitate a better understanding of the present invention. Accordingly, it should be understood that statements in the following discussion are to be read in this light, and not as admissions of prior art.

The Voice Call Continuity (VCC) is an IMS application server that provides the following functions:
  Enable IMS users to originate calls while roaming in 2G/3G network while maintaining their services and features in IMS.
  Enable the delivery of calls for an IMS user while roaming in 2G/3G network.
  Anchors the IMS call and provide the functionality required for inter-technology handoff of a call from IMS/LTE to 2G/3G.

Based on the current VCC 3GPP2 standard, the mobile is programmed with the VCC VDN (Virtual DN) and the following procedures calls for the use of the VDN to perform:
  Sending SMS Notification for Domain attachment to CDMA
  Calling the VDN to perform in-call Handoff from LTE/IMS to CDMA
  Calling the Emergency-VDN to perform LTE/IMS to CDMA on an emergency call in progress
  Additionally, the IMS subscriber has a limited profile in the HLR with WIN trigger that is used to trigger the call to be routed to IMS through the VCC. The address of the VCC to inquire for an IMS routing number is based on the point code of the VCC as stored in the subscriber's HLR profile.
  The following are the issues with the existing solution:
  The VDN #s are a hardcoded number in the Mobile and therefore the mobile is dedicated to one VCC server.
  The # can only be preprogrammed on the phone or some method of the air provisioning has to be used.
  Solution does not address Geo-Redundancy configuration.
  Solution does not address VCC capacity growth and need to move users to new VCC.
  Solution requires Emergency-VDN (provided by one operator) to be available in every roaming MSC.
  Solution is not optimized for making calls when the mobile is roaming in a 2G/3G network.
  There is only one hardcoded VCC point code in HLR

BRIEF SUMMARY OF THE INVENTION

The present invention pertains to a Voice Control Continuity (VCC) in a telecommunications network which also has a Borne Location Register (HLR), an S-Call Session Control Function (S-CSCF), and an IMS mobile or User Equipment (UE). The VCC comprises a network interface unit of the VCC which receives an indication that the mobile is registering with the network or attempting to make or receive an IMS communication session. The VCC comprises a processing unit of the VCC which assigns a VDN or a telephony network routing identifier for the mobile, and assigns a VCC point code. The VDN is sent from the network interface unit through the network to the UE or the mobile. The VCC point code for the mobile or the UE is sent from the network interface through the network to the HLR to update the mobile's or UE's profile data in the HLR.

The present invention pertains to a method for assigning a VCC to an IMS mobile or UE in a telecommunications network which also has an HLR and an S-CSCF. The method comprises the steps of receiving at a network interface unit of the VCC an indication that the mobile or UE is registering with the network or attempting to make or receive an IMS communication session. There is the step of assigning with a processing unit of the VCC a VDN or a telephony network routing identifier for the mobile or UE. There is the step of sending the VDN from the network interface unit through the network to the mobile or UE. There is the step of assigning with the processing unit a VCC point code. There is the step of sending the VCC point code for the mobile or UE from the network interface through the network to the HLR to update the mobile's or UE's profile data in the HLR.

BRIEF DESCRIPTION OF THE DRAWING

In the accompanying drawings, the preferred embodiment of the invention and preferred methods of practicing the invention are illustrated in which.

DETAILED DESCRIPTION

Figure 1:
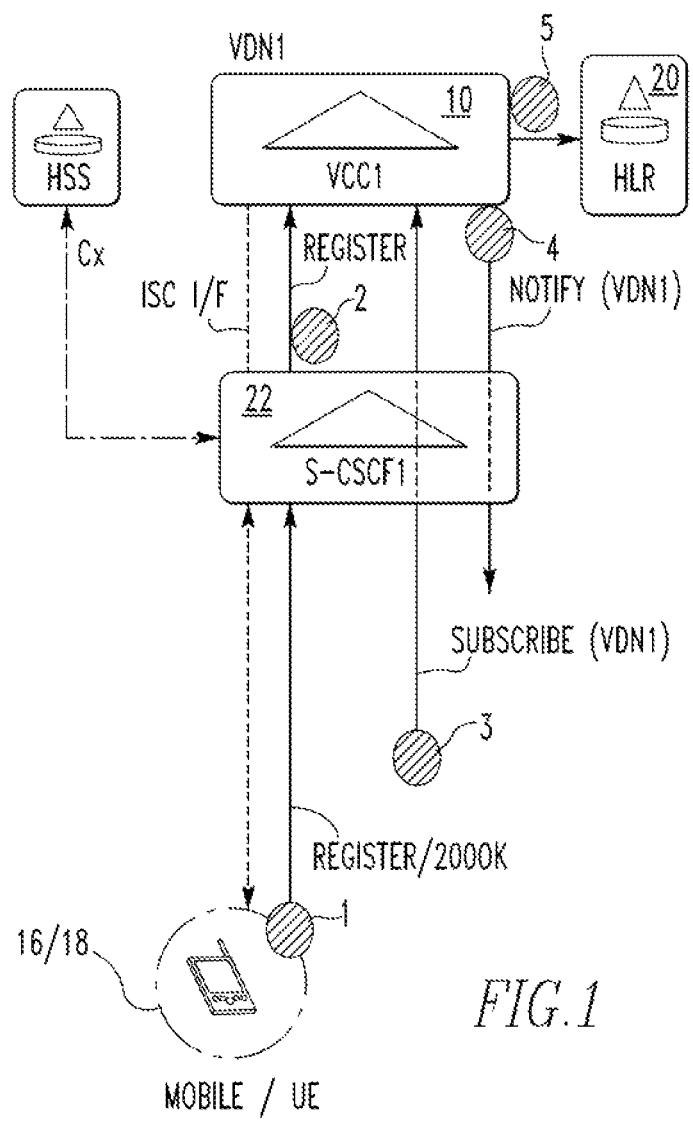
FIG. 1 shows the Subscribe/Notify Option of the present invention.
Figure 7:
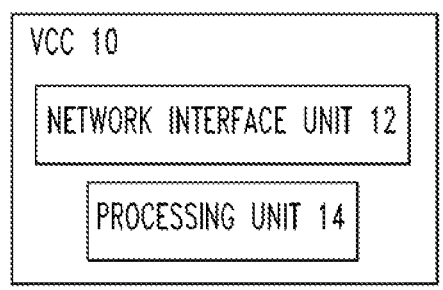
FIG. 7 is a block diagram of a VCC of the present invention.

Referring now to the drawings wherein like reference numerals refer to similar or identical parts throughout the several views, and more specifically to FIGS. 1 and 7 thereof, there is shown a VCC 10 in a telecommunications network which also has an HLR 20, an S-CSCF 22, and an IMS mobile 16 or UE 18. The VCC 10 comprises a network interface unit 12 of the VCC 10 which receives an indication that the mobile 16 is registering with the network or attempting to make or receive an IMS communication session. The VCC 10 comprises a processing unit 14 of the VCC 10 which assigns a VDN or a telephony network routing identifier for the mobile 16, and assigns a VCC 10 point code. The VDN is sent from the network interface unit 12 through the network to the UE 18 or the mobile 16. The VCC 10 point code for the mobile 16 or the UE 18 is sent from the network interface through the network to the HLR 20 to update the mobile's or UE's profile data in the HLR 20.

The processing unit 14 may assign an emergency VDN and the network interface unit 12 sends the emergency VDN and the VDN through the network to the HLR 20. The VON may be a unique DN dedicated to the VCC 10. The processing unit 14 selects the emergency VDN based on the mobile's or UE's current geographical location. The processing unit 14 may select the emergency VDN based on the mobile's current geographical location as reported in an access network identifier header in a SIP message.

The processing unit 14 may build an SIP message which includes the VDN and the emergency VDN, or the processing unit 14 updates parameters or data with the UE 18 or mobile 16 using Web HTTP using an Ut 3GPP interface, or OTAP (Over The Air Provisioning) protocol. The network may be a SS7 & SIGTRAN network and wherein the processing unit 14 assigns a routing identifier in the SS7 & SIGTRAN network to the mobile 16 or UE 18. The network interface unit 12 may send an IS-41 message with the VCC 10 point code for CDMA to the HLR 20, or a MAP message with the VCC 10 point code for GSM & UMTS to the HLR 20, or a set of digits for the SS7/SIGTRAN routing identifier and in the SS7/SIGTRAN network there is used GTT (Global Title Translation) based routing to route to the VCC 10. The processing unit 14 may refresh the assignment of the Emergency VDN so a new Emergency VDN is assigned with a newly reported geographical location of the IMS mobile 16 or UE 18.

The present invention is related to a method for assigning a VCC 10 to an IMS mobile 16 or UE 18 in a telecommunications network which also has an HLR 20 and an S-CSCF 22. The method comprises the steps of receiving at a network interface unit 12 of the VCC 10 an indication that the mobile 16 or UE 18 is registering with the network or attempting to make or receive an IMS communication session. There is the step of assigning with a processing unit 14 of the VCC 10 a VDN or a telephony network routing identifier for the mobile 16 or UE 18. There is the step of sending the VDN from the network interface unit 12 through the network to the mobile 16 or UE 18. There is the step of assigning with the processing unit 14 a VCC 10 point code. There is the step of sending the VCC 10 point code for the mobile 16 or UE 18 from the network interface through the network to the HLR 20 to update the mobile's or UE's profile data in the HLR 20.

The assigning step may include the step of assigning with the processing unit 14 an emergency VDN and the sending step may include the step of sending the emergency VDN and the VDN from the network interface unit 12 through the network to the HLR 20. The VDN may be a unique DN dedicated to the VCC 10. There me be the step of selecting the emergency VDN by the processing unit 14 based on the mobile's or UE's current geographical location. The step of selecting the emergency VDN by the processing unit 14 may include the step of selecting the emergency VDN by the processing unit 14 based on the mobile's current geographical location as reported in an access network identifier header or in a SIP message.

There may be the step of the processing unit 14 building an SIP message which includes the VDN and the emergency VDN, or the processing unit 14 updating parameters or data with the UE 18 or mobile 16 using Web HTTP using Ut 3GPP interface, or OTAP (Over The Air Provisioning) protocol. The network may be a SS7 & SIGTRAN network and the assigning step may include the step of assigning with the processing unit 14 a routing identifier in the SS7 & SIGTRAN network to the mobile 16 or UE 18. The step of sending the VCC 1.0 point code may include the step of sending an IS-41 message with the VCC 10 point code for CDMA to the HLR 20, or a MAP message with the VCC 10 point code for GSM & UMTS to the HLR 20, or a set of digits for the SS7/SIGTRAN routing identifier and in the SS7/SIGTRAN network there is used GTT (Global Title Translation) based routing to route to the VCC 10. There may be the step of refreshing the assignment of the Emergency VDN so a new Emergency VDN is assigned with a newly reported geographical location of the IMS mobile 16 or UE 18.

The present invention introduces a technique to enable the dynamic assignment of a VCC 10 to a subscriber at the time of registration with the IMS network or when attempting to make or receive an IMS communication session.

In the operation of the invention, the sequence of events is as follows:

UE (User Element, Mobile, SIP client) initiates a registration with the IMS Network. This is the same normal Registration procedure used for IMS.

The S-CSCF 22 downloads from the HSS the iFC (Initial Filter Criteria) which indicates to the S-CSCF 22 which Application Servers (AS) it needs to invoke for this subscriber. In the case here, the VCC 10 (Voice Call Continuity) server is one of those ASs. The S-CSCF 22 would then send a 3rd Party Register to the VCC 10 AS. For this invention, the S-CSCF 22 can select any one of the VCC 10 AS that are available in the network, where as prior to this invention, the S-CSCF 22 must send the 3rd Party Register to a specific VCC 10 server that is associated with the registering subscriber.

The VCC 10 AS receives the 3rd Party Register and starts the procedure being described here. The VCC 10 AS builds a SIP message (using one of the options illustrated here), and includes in it the VCC 10 VDN (Virtual DN) and the Emergency VCC 10 VDN. The VCC 10 DN is a unique DN dedicated for a specific VCC 10 AS (as described in the standard). The Emergency DN can be selected based on the current geographical location of the UE 18 as reported in the PANI (P Access Network Identifier) Header in the REGISTER message. This is very advantageous since these Emergency VDNs will have local significance.

The preferred method for relaying the information to the UE 18 is using the SIP message MESSAGE as it can provide the flexibility of formatting the body in a way similar to Over the Air Provisioning (OTAP) which uses an SMS like body format.

The second step that VCC 10 performs is to send the 3G HLR 20 server of the subscriber an IS-41 message to provide the HLR 20 with new information related to the WIN data for the subscriber. The new WIN information is an update of Point Code to be that of the VCC 10 AS.

Note that the sequence of actions to the UE 18 and HLR 20 can be done in parallel or in sequence to UE 18 first and then HLR 20, or in sequence to HLR 20 then UE 18.

The HLR 20 updates the subscriber profile with the Point Code/SS7 Address of the VCC 10 which is used as the SCP Address for the WIN/MAP Trigger when the UE initiates calls while roaming in 3G networks.

The UE 18 receives the SIP message and stores the VCC 10 VDN and emergency VDN in its permanent memory to be used during inter-technology Voice handoff (VCC) of a normal call or an emergency call as specified in the standard.

The following outlines 4 different ways of implementing the invention:

There are three options that can be built on the VCC 10 for this invention:
  Subscribe/Notify: This approach makes use of the Subscribe/Notify concept in SIP signaling to relay the information from the VCC 10 to the UE 18.

Invite: This approach makes use of the ability to carry various content types in the SIP signaling and uses the INVITE method to achieve providing the UE 18 with VCC 10 information.

Message: This approach uses the MESSAGE SIP method to relay the information which is equivalent in essence to the method used to deliver SMS text messages over IMS/IP. Additionally, SMS is used in 3G network to provide OTAP through special formatting of the SMS and serviceID which can be mirrored to provide the VCC 10 information to the UE 18.

The fourth option that is described is one based on a shared S-CSCF 22 and TAS being able to provide the VDN information to the UE 18 while the TAS addresses any HLR 20 update.

Subscribe/Notify Method

Figure 2:
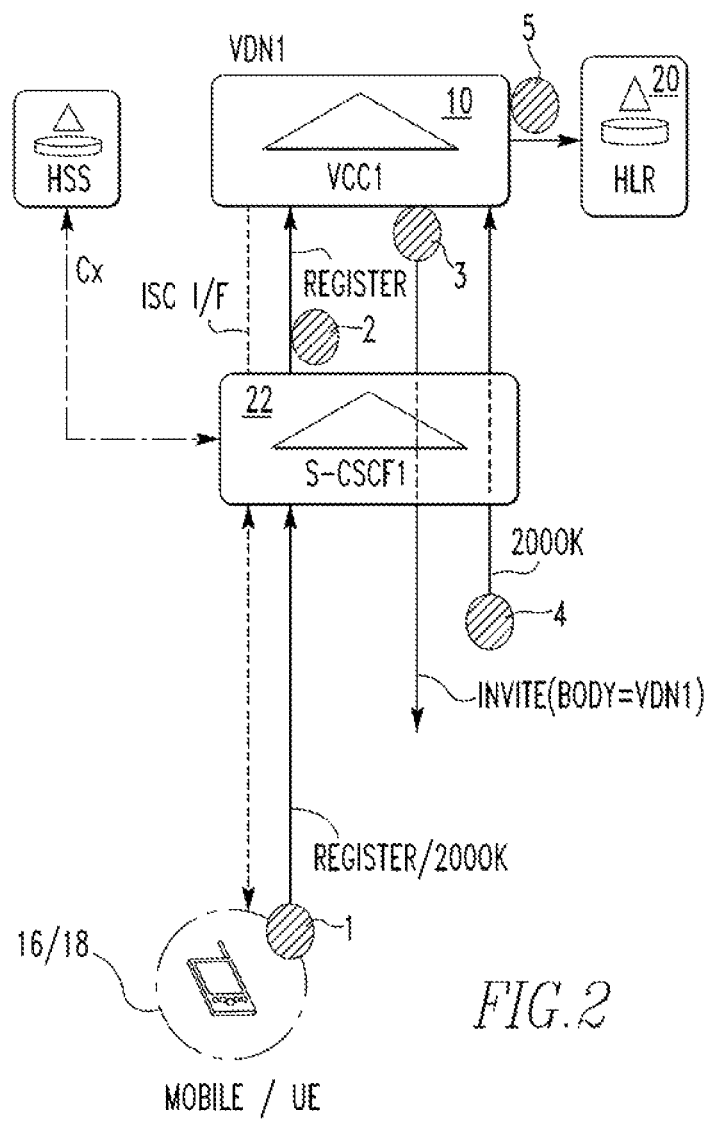
FIG. 2 shows the INVITE Option of the present invention.
Figure 3:
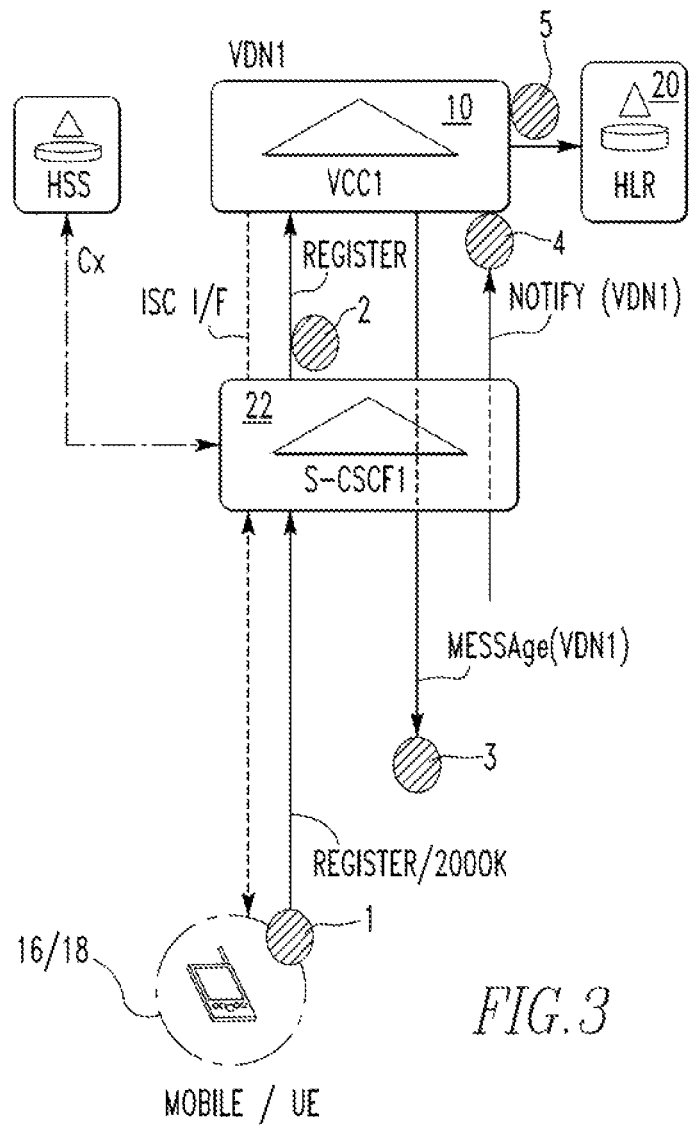
FIG. 3 shows the MESSAGE Option of the present invention.
Figure 4:
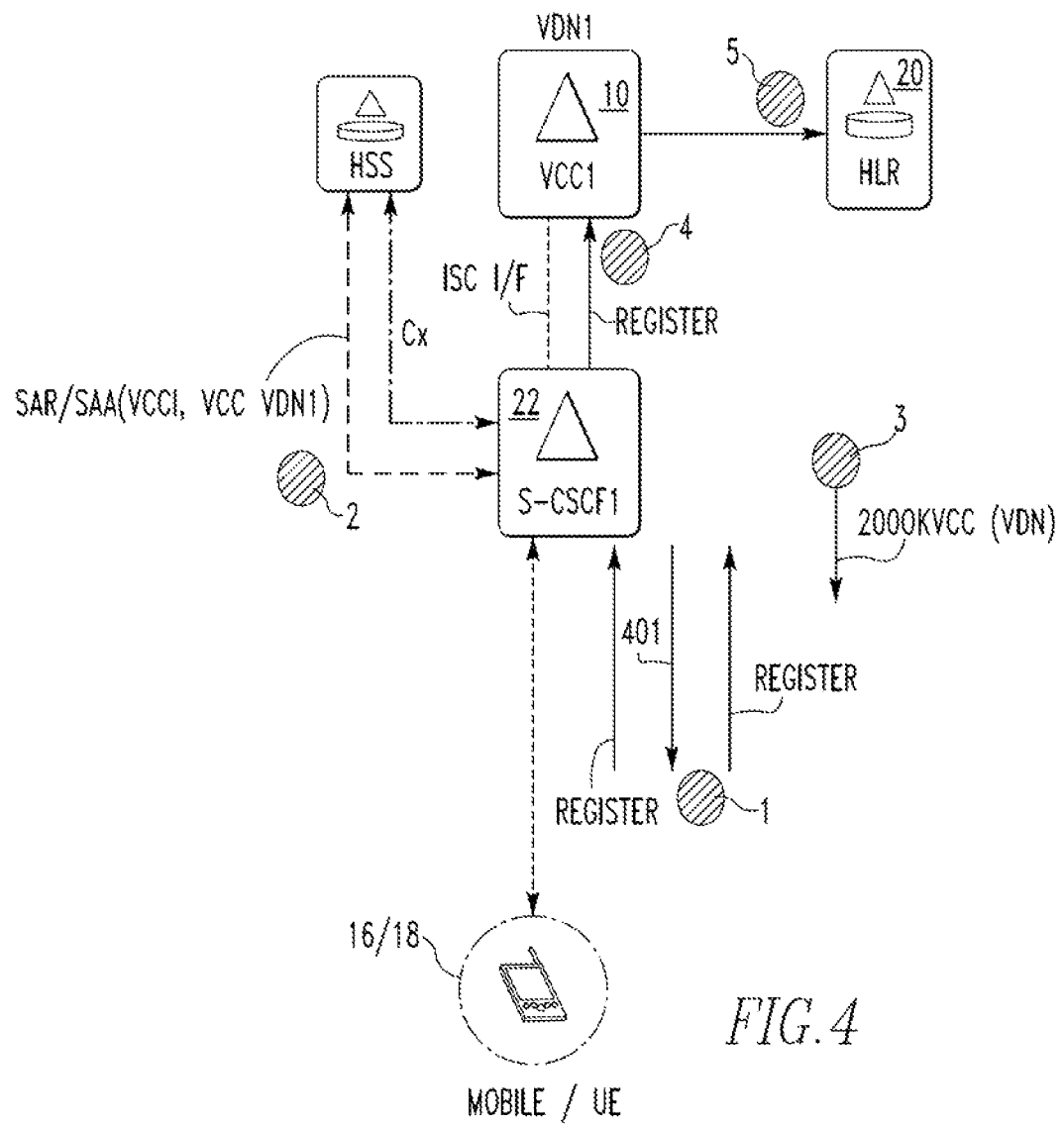
FIG. 4 shows the S-CSCF Assisted Option of the present invention.

FIG. 1 illustrates the Subscribe/Notify method and the steps are summarized as follows:
1. Mobile IMS Registration procedure
2. 3rd Party Register to VCC1
3. Mobile 16 Sends a Subscribe For VDN Event
4. VCC 10 sends NOTIFY with VDN and Emergency-VDN based on the location of the user (based on PANI) to the Mobile 16
5. Update HLR 20 with VCC1 Point code for the subscriber INVITE Method FIG. 2 illustrates the INVITE method and the steps are summarized as follows:
1. Mobile 16 IMS Registration procedure
2. 3rd Party Register to VCC1
3. VCC 10 send INVITE to Mobile 16 with Body having VDN1 and Emergency-VDN based on the location of the user (based on PANI) (XML or other means)
4. Mobile 16 Sends back 2000K acknowledging the receipt of information
5. Update HLR 20 with VCC1 Point code for the subscriber MESSAGE Message Option FIG. 3 illustrates the MESSAGE method and the steps are summarized as follows:
1. Mobile 16 IMS Registration procedure
2. 3rd Party Register to VCC1
3. VCC 10 sends MESSAGE Message with VDN and Emergency-VDN based on the location of the user (based on PANI) to the Mobile 16
   The message body can be encoded to be of an application type that is identical to an over the air provisioning. Other formal content type can also be used.
4. Mobile 16 Acknowledges
5. Update HLR 20 with VCC1 Point code for the subscriber S-CSCF 22 Assisted Option FIG. 4 illustrates the S-CSCF 22 assisted method and the steps are summarized as follows:
1. Mobile 16 IMS Registration procedure
2. S-CSCF 22 Retrieves the Subscriber Profile, which will include the VCC 10 server and the VDN associated with it
3. S-CSCF 22 includes in the 2000K sent to Mobile 16 a Body containing the VDN number and Emergency-VDN based on the location of the user (based on PANI) (XML format or other way)
4. 3rd Party Register to VCC 10
5. Update HLR 20 with VCC1 Point code for the subscriber The present invention provides the following advantages:
Eliminate Need to Hardcode VDN in Mobile 16
Emergency VDN are provided by local VCC 10 server ensuring local significance for routing.
Eliminate the need to hardcode the VCC 10 to one Mobile 16 for in-bound calling while roaming into IMS
Address Growth of Subscriber and VCC 10 re-allocation without requiring to re-program the mobiles (Refer to FIG. 5.)
Address the Geo Redundancy issue (Refer to FIG. 6.)

Figure 5:
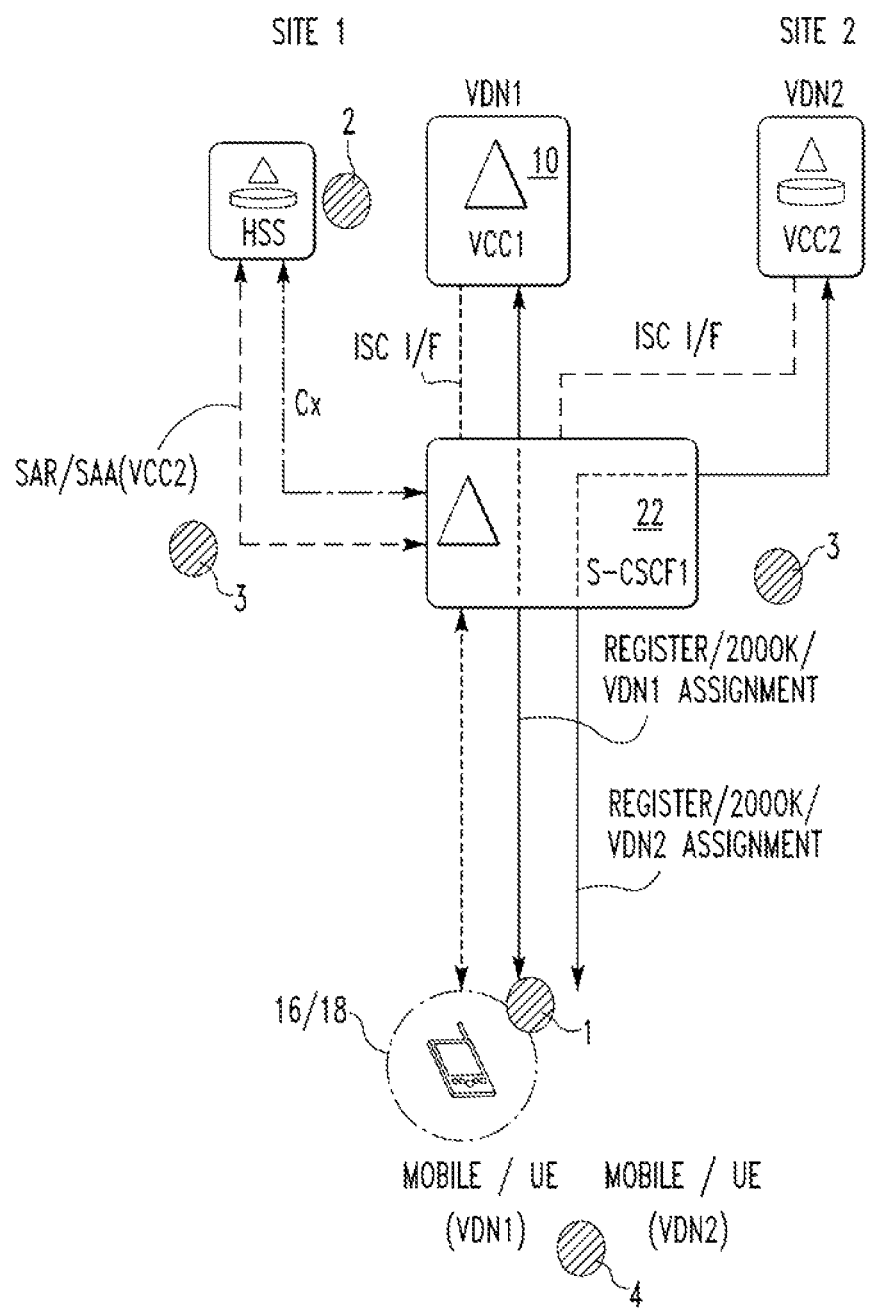
FIG. 5 shows the Benefit to Address Subscriber Growth of the present invention.

In regard to FIG. 5:
1. Mobile IMS Registration procedure & Gets Assigned VCC1 (VDN1).
2. Because of growth, Subscribers need to be moved from VCC1 to VCC2. For those subscribers the HSS profile is updated with VCC2 as the VCC providing the new service for Mobile1. (This can force a network Initiated De-registration.)
3. Mobile Reregister and the HSS Profile Now point to VCC2 to as its VCC. And the Dynamic VDN Assignment provides the mobile with VDN2.
4. Mobile updates its VDN with VDN2.

Figure 6:
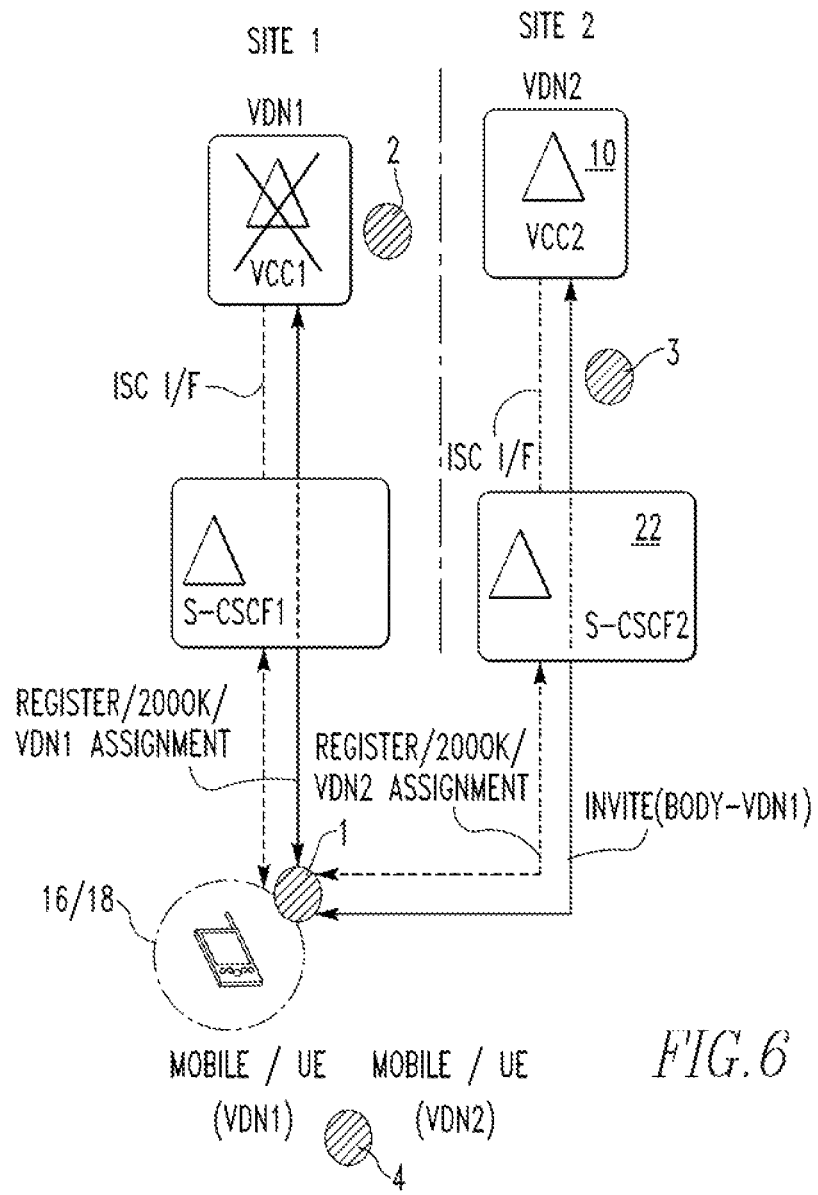
FIG. 6 shows the Benefit to Address Geo-Redundancy Deployment of the present invention.

In regard to FIG. 6:
1. Mobile IMS Registration procedure & Gets Assigned VCC1 (VDN1).
2. VCC1 is down or Site 1 is down.
3. Mobile Reregister and is directed to Site 2 and VCC2 where the Dynamic VDN Assignment provides the mobile with VDN2.
4. Mobile updates its VDN with VDN2.

Figure 8:
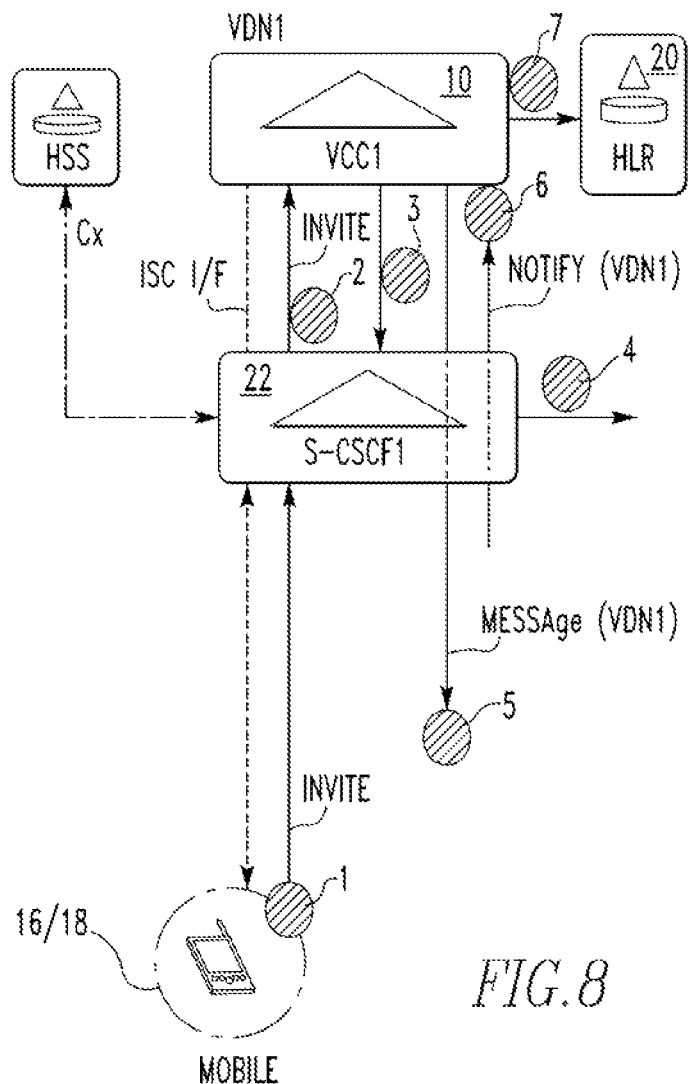
FIG. 8 shows an assignment while the user is attempting a communication session.

In regard to FIG. 8 showing a VDN Assignment while attempting a Communication Session:
1. Mobile initiates a communication session (INVITE)
2. A VCC AS is invoked based on iFC of subscriber. (in this invention any VCC AS can be used if no previously VCC is assigned)
3. VCC processes the communication session as normally.
4. S-CSCF proceeds with the session
5. VCC detects that the UE was previously not assigned a Dynamic VDN. VCC sends Message Message with VDN and Emergency-VDN based on the location of the user (based on PANI) to the Mobile. The message body can be encoded to be of an application type that is identical to an over the air provisioning. Other formal content type can also be used.
6. Mobile Acknowledges
7. Update HLR with VCC1 Point code for the subscriber

ABBREVIATIONS

CSCF Call Session Control Function
HSS Home Subscriber Subsystem
HLR Home Location Register
PANI P-Access Network Info
S-CSCF Serving Call Session Control Function
TAS Telephony Application Server
VCC Voice Call continuity
VDN Virtual Directory Number
UE User Equipment

REFERENCE, INCORPORATED BY REFERENCE HEREIN

3GPP2 X.S00042—Voice Call Continuity

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following, claims.

The invention claimed is:

1. A method for assigning a Voice Control Continuity (VCC) to a User Equipment (UE) in a telecommunications network which also has a Home Location Register (HLR), the method comprising the steps of:
   receiving at a network interface unit of the VCC an indication that the UE is registering with the network;
   assigning with a processing unit of the VCC a telephony network routing identifier for the UE in response to receiving the indication;
   sending the telephony network routing identifier from the network interface unit through the network to the UE;
   assigning with the processing unit a VCC point code for the UE; and
   sending the VCC point code for the UE from the network interface through the network to the HLR to update the UE's profile data in the HLR with the VCC point code.

2. The method of claim 1 wherein the telephony network routing identifier assigning step includes the step of assigning with the processing unit an emergency virtual directory number (VDN) and the sending step includes the step of sending the emergency virtual directory number (VDN) and the telephony network routing identifier from the network interface unit through the network to the HLR.

3. The method of claim 2 wherein the telephony network routing identifier is a unique virtual directory number (VDN) dedicated to the VCC.

4. The method of claim 3 including the step of selecting the emergency virtual directory number (VDN) by the processing unit based on the UE's current geographical location.

5. The method of claim 4 wherein the step of selecting the emergency virtual directory number (VDN) by the processing unit includes the step of selecting the emergency virtual directory number (VDN) by the processing unit based on the mobile's current geographical location as reported in at least one of an access network identifier header or a SIP message.

6. The VCC of claim 2 including the step of the processing unit: building an SIP message which includes the telephony network routing identifier and the emergency virtual directory number (VDN), or updating parameters or data with the UE using at least one of Web HTTP using an Ut 3GPP interface, or OTAP (Over The Air Provisioning) protocol.

7. The method of claim 1 wherein the network is a SS7 & SIGTRAN network and the telephony network routing identifier assigning step includes the step of assigning with the processing unit a routing identifier in the SS7 & SIGTRAN network to the UE.

8. The method of claim 7 wherein the step of sending the VCC point code includes the step of:
   sending an IS-41 message with the VCC point code for CDMA to the HLR, or
   sending a MAP message with the VCC point code for GSM & UMTS to the HLR, or
   sending a set of digits for the SS7/SIGTRAN routing identifier and in the SS7/SIGTRAN network GTT (Global Title Translation) based routing is used to route to the VCC.

9. The method of claim 5 including the step of refreshing the assignment of the Emergency virtual directory number (VDN) so a new Emergency VDN is assigned with a newly reported geographical location of the UE.

10. A Voice Control Continuity (VCC) in a telecommunications network which also has a Home Location Register (HLR) and a User Equipment (UE), the VCC comprising:
    a network interface unit of the VCC which receives an indication that the UE is registering with the network; and
    a processing unit of the VCC which assigns a telephony network routing identifier for the UE, and assigns a VCC point code in response to the received indication,
    wherein the telephony network routing identifier is sent from the network interface unit through the network to the UE, and the VCC point code for the UE sent from the network interface through the network to the HLR to update the UE's profile data in the HLR.

11. The VCC of claim 10 wherein the processing unit assigns an emergency virtual directory number (VDN) VDN and the network interface unit sends the emergency virtual directory number (VDN) and the telephony network routing identifier through the network to the HLR.

12. The VCC of claim 11 wherein the telephony network routing identifier is a unique virtual directory number (VDN) dedicated to the VCC.

13. The VCC of claim 12 wherein the processing unit selects the emergency virtual directory number (VDN) based on the UE's current geographical location.

14. The VCC of claim 13 wherein the processing unit selects the emergency virtual directory number (VDN) based on the mobile's current geographical location as reported in at least one of an access network identifier header or a SIP message.

15. The VCC of claim 11 wherein the processing unit:
    builds an SIP message which includes the telephony network routing identifier and the emergency virtual directory number (VDN), or
    updates parameters or data with the UE using at least one of Web HTTP using an Ut 3GPP interface, or OTAP (Over The Air Provisioning) protocol.

16. The VCC of claim 10 wherein the network is a SS7 & SIGTRAN network and wherein the processing unit assigns a telephony network routing identifier in the SS7 & SIGTRAN network to the UE.

17. The VCC of claim 16 wherein the network interface unit:
    sends an IS-41 message with the VCC point code for CDMA to the HLR, or
    sends a MAP message with the VCC point code for GSM & UMTS to the HLR, or
    sends a set of digits for the SS7/SIGTRAN routing identifier and in the SS7/SIGTRAN network GTT (Global Title Translation) based routing is used to route to the VCC.

18. The VCC of claim 14 wherein the processing unit refreshes the assignment of the Emergency virtual directory number (VDN) so a new Emergency virtual directory number (VDN) is assigned with a newly reported geographical location of the UE.

* * * * *

UNITED STATES PATENT AND TRADEMARK OFFICE
CERTIFICATE OF CORRECTION

PATENT NO. : 8,738,014 B2  
APPLICATION NO. : 13/524137  
DATED : May 27, 2014  
INVENTOR(S) : Boulos It is certified that error appears in the above-identified patent and that said Letters Patent is hereby corrected as shown below:

In the Specification

In Column 1, Line 6, delete "EMS" and insert -- IMS --, therefor.

In Column 1, Line 67, delete "Borne" and insert -- Home --, therefor.

In Column 3, Line 3, delete "VON" and insert -- VDN --, therefor.

In Column 3, Line 64, delete "1.0" and insert -- 10 --, therefor.

In Column 4, Line 55, delete "UE initiates" and insert -- UE 18 initiates --, therefor.

In Column 5, Line 35, delete "2000k" and insert -- 200OK --, therefor.

Signed and Sealed this  
Seventh Day of April, 2015

Michelle K. Lee  
*Director of the United States Patent and Trademark Office*